United States Patent
Young et al.

(10) Patent No.: US 9,899,676 B2
(45) Date of Patent: *Feb. 20, 2018

(54) NICKEL HYDROXIDE POSITIVE ELECTRODE FOR ALKALINE RECHARGEABLE BATTERY

(71) Applicant: BASF Corporation, Florham Park, NJ (US)

(72) Inventors: Kwo Young, Troy, MI (US); Lixin Wang, Ypsilanti, MI (US); William Mays, Commerce, MI (US); Benjamin Reichman, West Bloomfield, MI (US); Hu Chao-Ian, Rochester Hills, MI (US); Diana Wong, Sterling Heights, MI (US); Jean Nei, Southgate, MI (US)

(73) Assignee: BASF Corporation, Florham Park, NJ (US)

( * ) Notice: Subject to any disclaimer, the term of this patent is extended or adjusted under 35 U.S.C. 154(b) by 368 days.

This patent is subject to a terminal disclaimer.

(21) Appl. No.: 14/614,838

(22) Filed: Feb. 5, 2015

(65) Prior Publication Data
US 2016/0233506 A1  Aug. 11, 2016

(51) Int. Cl.
*H01M 4/52* (2010.01)
*H01M 4/32* (2006.01)
*H01M 10/30* (2006.01)
*H01M 10/34* (2006.01)

(52) U.S. Cl.
CPC ............... *H01M 4/52* (2013.01); *H01M 4/32* (2013.01); *H01M 10/30* (2013.01); *H01M 10/345* (2013.01)

(58) Field of Classification Search
CPC ........... H01M 4/52; H01M 4/32; H01M 10/30
USPC ......................................................... 429/223
See application file for complete search history.

(56) References Cited

U.S. PATENT DOCUMENTS

| 5,348,822 A | 9/1994 | Ovshinsky et al. |
| 5,567,549 A | 10/1996 | Ovshinsky et al. |
| 5,569,563 A | 10/1996 | Ovshinsky et al. |
| 5,905,003 A | 5/1999 | Young et al. |

(Continued)

FOREIGN PATENT DOCUMENTS

| JP | 2002-117842 A | 4/2002 |
| JP | 2003-077468 A | 3/2003 |
| JP | 2010-033909 A | 2/2010 |

OTHER PUBLICATIONS

English Language Abst. of JP 2002-117842, Apr. 19, 2002.
(Continued)

*Primary Examiner* — Basia A Ridley
*Assistant Examiner* — James M Erwin
(74) *Attorney, Agent, or Firm* — Dinsmore & Shohl LLP

(57) ABSTRACT

Certain nickel hydroxide active cathode materials for use in alkaline rechargeable batteries are capable of transferring >1.3 electrons per Ni atom under reversible electrochemical conditions. The specific capacity of the nickel hydroxide active materials is for example ≥325 mAh/g. The cathode active materials exhibit an additional discharge plateau near 0.8 V vs. a metal hydride (MH) anode. Ni in an oxidation state of less than 2, such as $Ni^{1+}$, is able to participate in electrochemical reactions when using the present cathode active materials. It is possible that up to 2.3 electrons, up to 2.5 electrons or more may be transferred per Ni atom under electrochemical conditions.

17 Claims, 6 Drawing Sheets

(56) References Cited

U.S. PATENT DOCUMENTS

| | | |
|---|---|---|
| 6,042,753 A | 3/2000 | Isumi et al. |
| 6,086,843 A | 7/2000 | Ovshinsky et al. |
| 6,228,535 B1 | 5/2001 | Fierro et al. |
| 2001/0019799 A1 | 9/2001 | Fetcenko et al. |
| 2014/0093777 A1 | 4/2014 | Kakeya et al. |

OTHER PUBLICATIONS

English Language Abst. of JP 2010-033909, Feb. 12, 2010.
English Language Abst. of JP 2003-077468, Mar. 14, 2003.
Int. Search Report dated May 24, 2016.
Corrigan, et al., Journal of Electrochemical Society, vol. 136, No. 3, Mar. 1989, pp. 613-619.
A. Van der Ven, et al., Journal of Electrochemical Society, vol. 153, No. 2, 2006, pp. A210-A215.

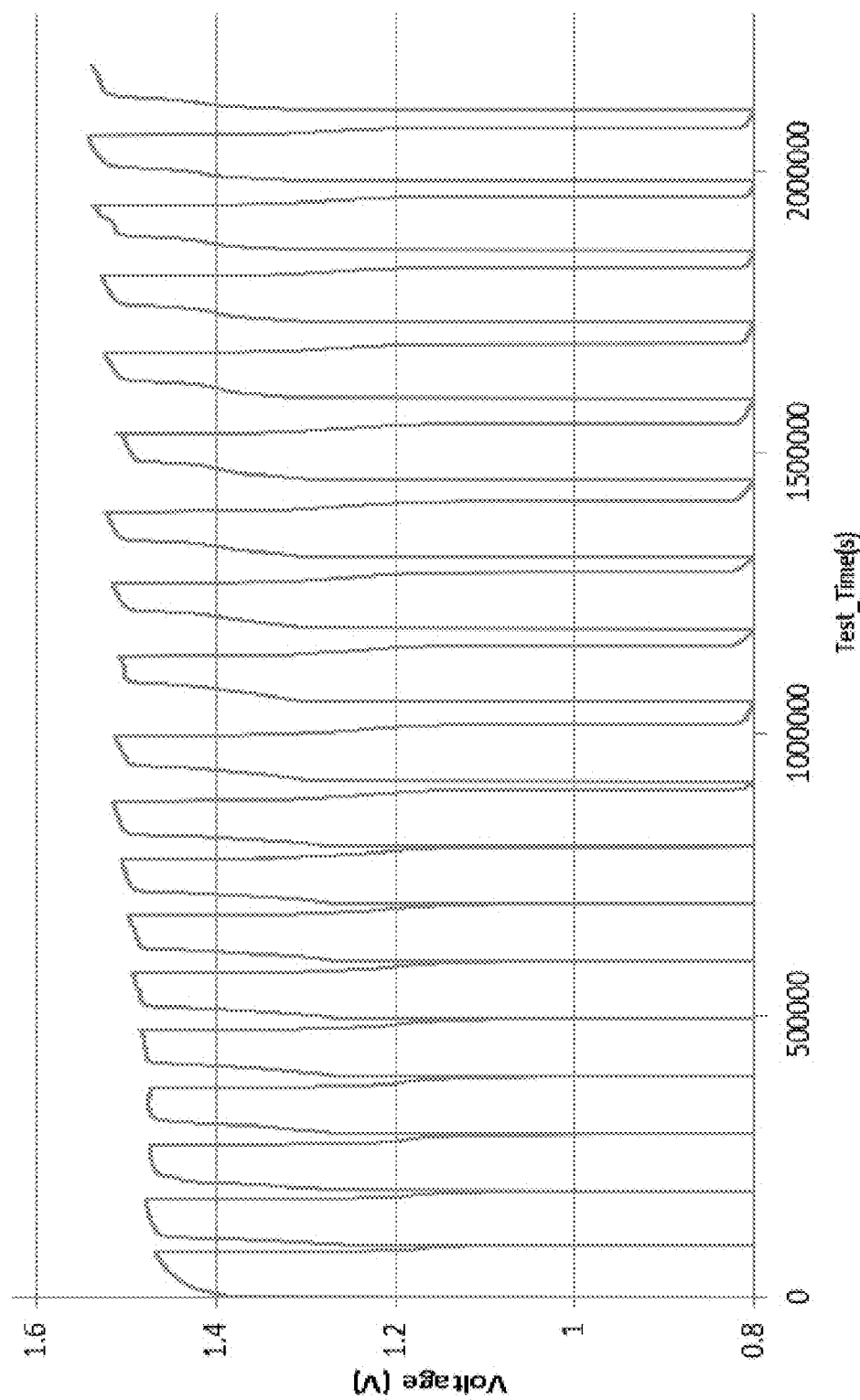
Fig. 1 ($Ni_{94}Co_6$)

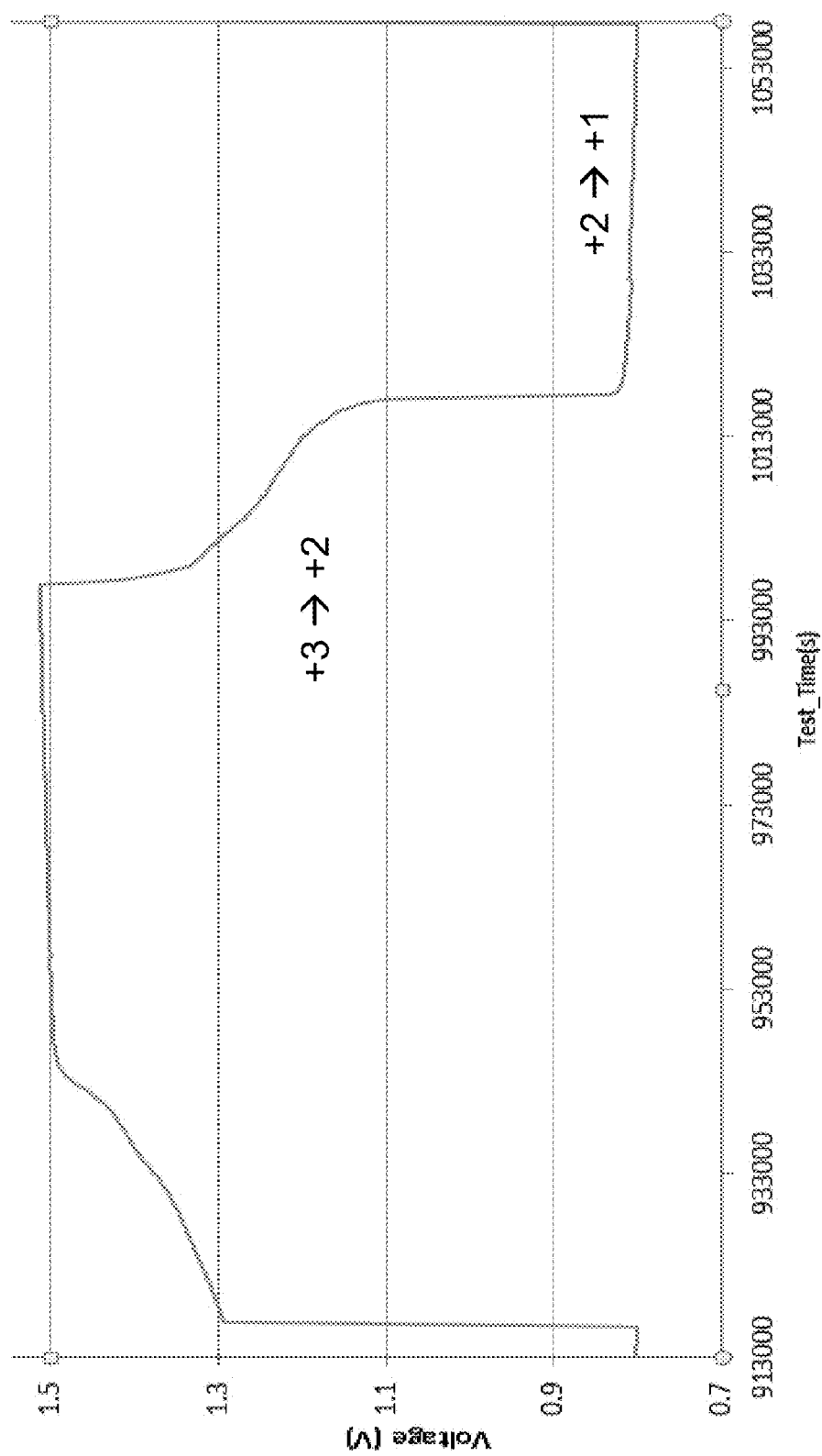

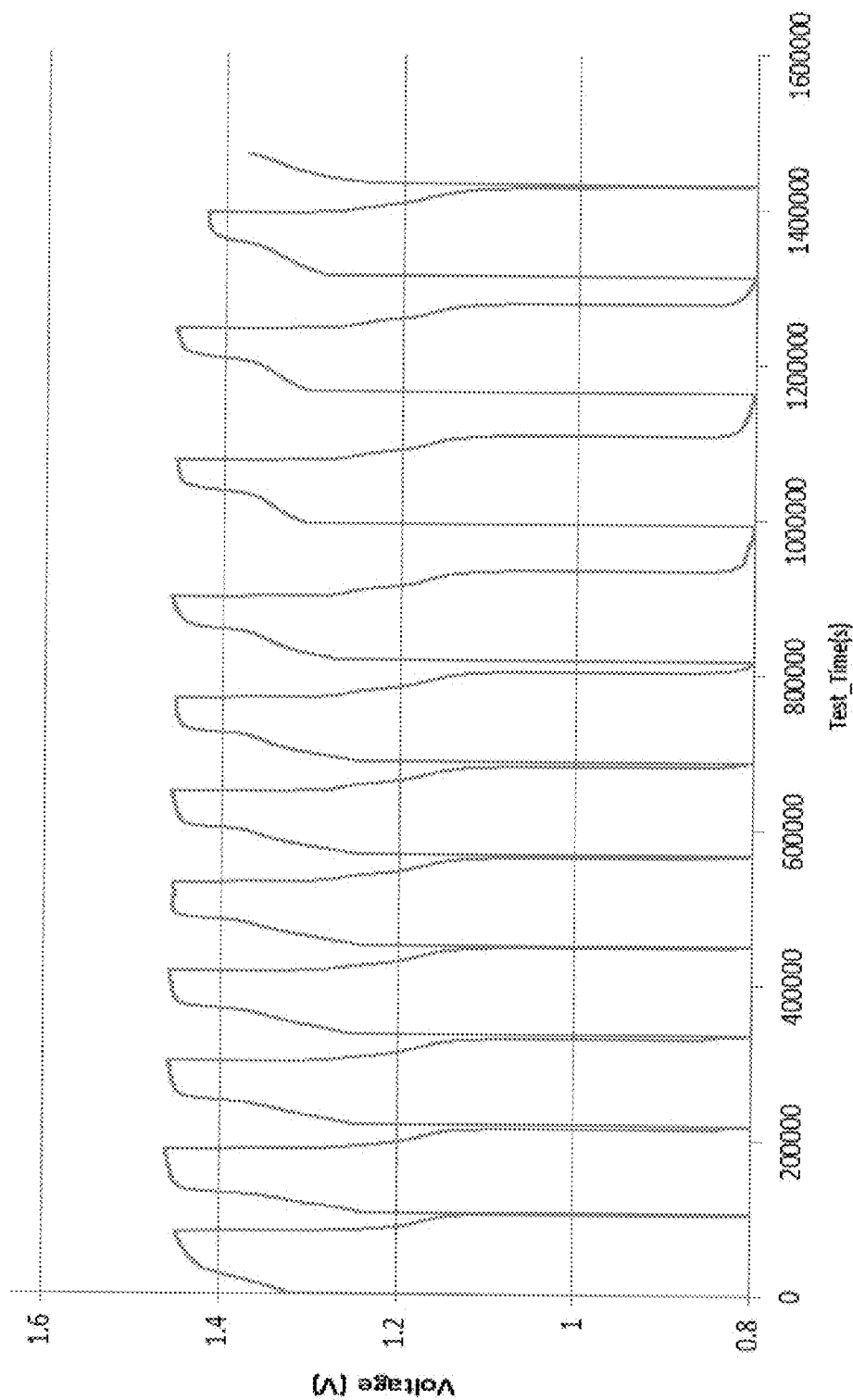
Fig. 3 ($Ni_{85}Co_5Al_{10}$)

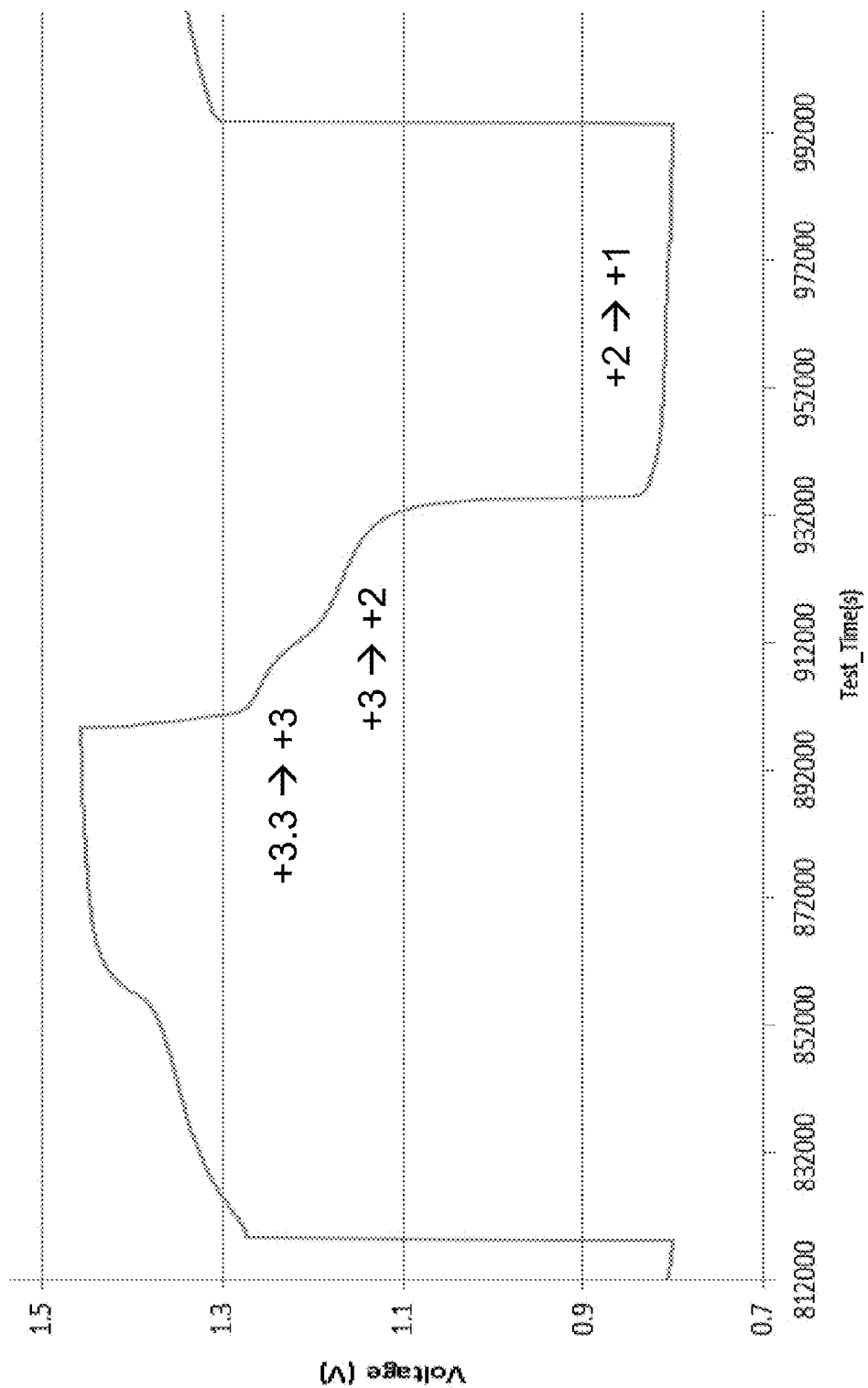

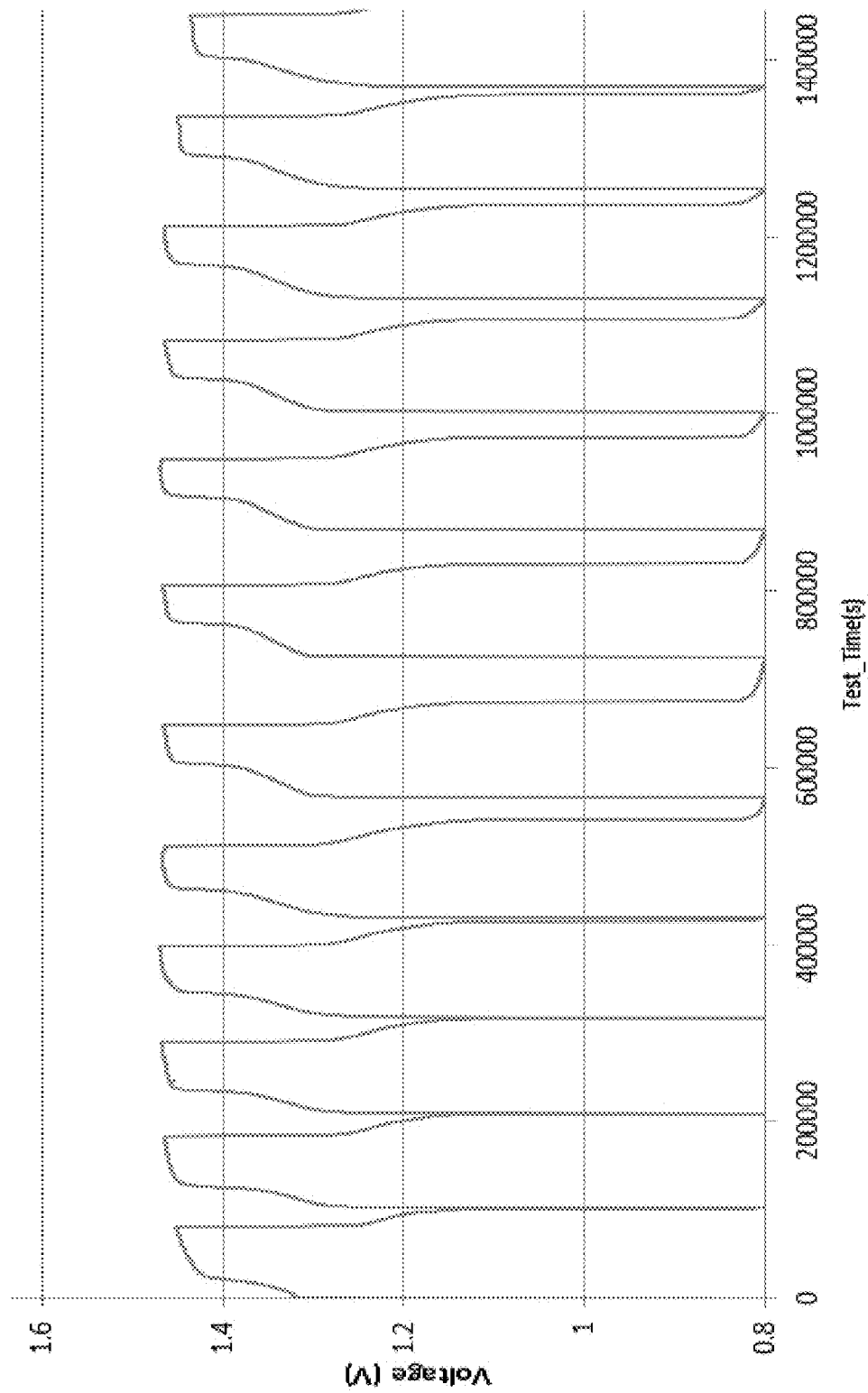
Fig. 5 ($Ni_{69}Co_5Zn_6Al_{20}$)

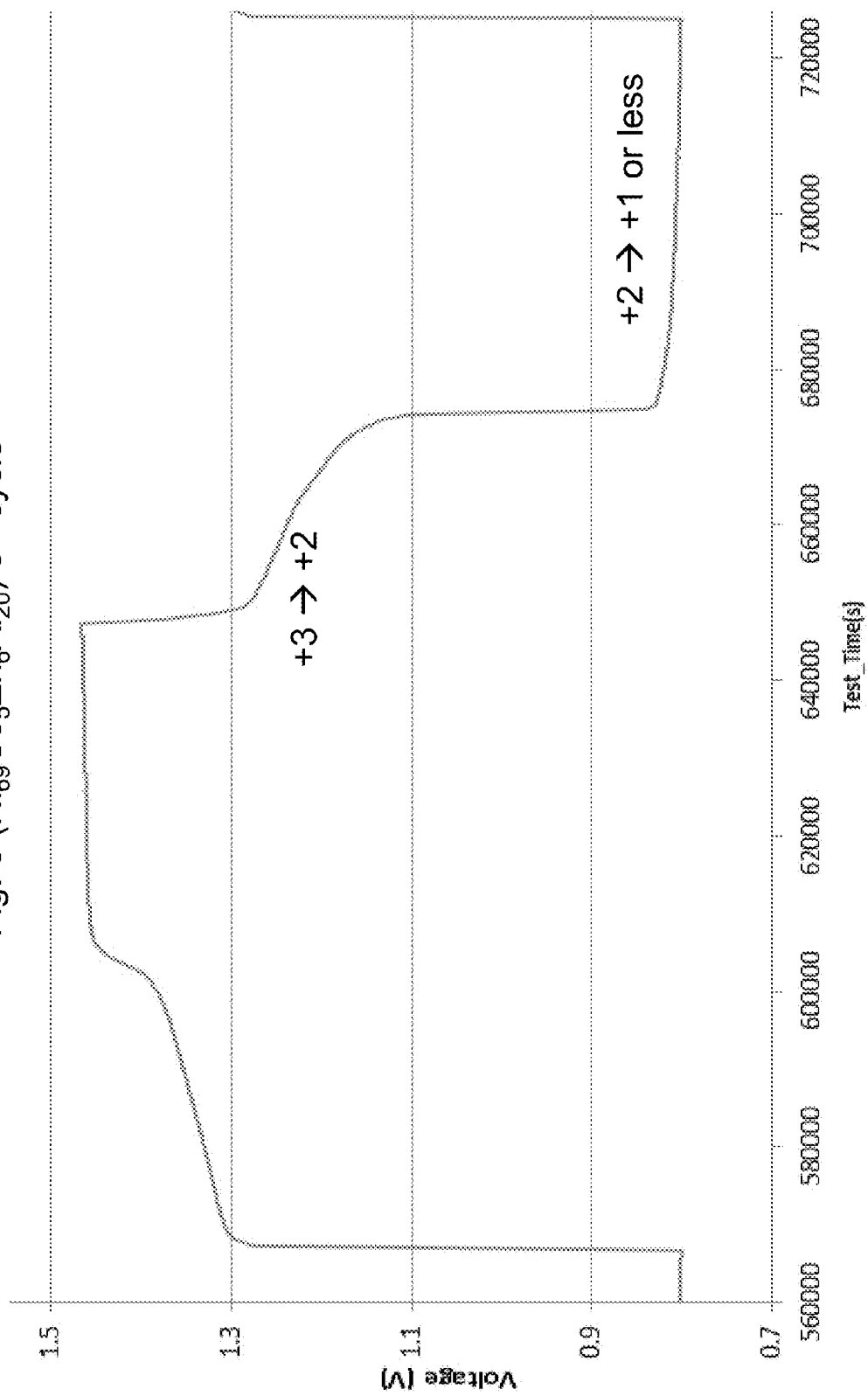

NICKEL HYDROXIDE POSITIVE ELECTRODE FOR ALKALINE RECHARGEABLE BATTERY

GOVERNMENT SUPPORT STATEMENT

This invention was made with government support under DE-AR0000386 awarded by Advanced Research Projects Agency-Energy. The government has certain rights in the invention.

The present invention relates to optimized nickel hydroxide active material for use in a positive electrode of an alkaline rechargeable battery.

BACKGROUND OF THE INVENTION

Nickel metal hydride (NiMH) batteries (cells) employ a negative electrode (anode) capable of reversible electrochemical storage of hydrogen. NiMH cells usually employ a positive electrode (cathode) comprising nickel hydroxide active material. The negative and positive electrodes are spaced apart in an aqueous alkaline electrolyte. Upon application of an electrical potential across the cell, hydrogen ions from the electrolyte combine with electrons and diffuse into the bulk of the hydrogen storage alloy to form a metal hydride. Upon discharge, stored hydrogen is released from the metal hydride as protons and electrons. Water is reformed from the protons and hydroxyl ions in the electrolyte.

NiMH batteries are employed in a wide variety of end uses, for instance in portable consumer products such as digital cameras, cell phones, etc., electric and hybrid vehicle applications and industrial standby applications.

The charge and discharge reactions that take place at the nickel hydroxide positive electrode are:

$$Ni(OH)_2 + OH^- \rightleftharpoons NiOOH + H_2O + e^-$$

Nickel hydroxide oxidizes to nickel oxyhydroxide upon charging; upon discharge nickel oxyhydroxide is reduced back to nickel hydroxide.

Nickel cadmium (NiCd) cells also employ a positive electrode comprising nickel hydroxide active material. Other types of nickel based cells include nickel hydrogen, nickel zinc and nickel iron.

The electrochemical reaction at the cathode is known to involve the transfer of one electron, between the stable $Ni^{2+}$ β phase of $Ni(OH)_2$ and the $Ni^{3+}$ β phase of NiOOH. The theoretical specific capacity of nickel hydroxide active material based on this is 289 mAh/g.

Transfer of more than one electron per Ni atom would lead to higher specific capacity. Nickel hydroxide material capable of transferring more than one electron is mentioned for instance in U.S. Pat. Nos. 5,348,822, 5,569,563, 5,567,549 and 6,228,535. In these prior arts, more than one electron transfer per Ni atom may involve a highly oxidized γ NiOOH phase.

SUMMARY OF THE INVENTION

Surprisingly, it has now been found that certain nickel hydroxide active cathode materials are capable of transferring >1.3 electrons per Ni atom under reversible electrochemical conditions. The specific capacity of the present nickel hydroxide active materials is for example ≥325 mAh/g. The cathode active materials of this invention exhibit an additional discharge plateau near 0.8 V vs. a MH anode.

It is proposed that Ni in an oxidation state of less than 2, such as $Ni^{1+}$, is able to participate in electrochemical reactions when using the present cathode active materials. Thus, it is possible that up to 2.3 electrons, up to 2.5 electrons or more may be transferred per Ni atom under electrochemical conditions.

DETAILED DISCLOSURE

The active materials of the positive electrodes participate in charge/discharge reactions of an electrochemical cell. The active materials are in general modified nickel hydroxide. Modified nickel hydroxide may contain one or more modifiers selected from the group consisting of Co, Cd, Ag, V, Sb, Ca, Mg, Al, Bi, Cr, Cu, Fe, In, rare earths, Mn, Ru, Sn, Ti, Ba, Si, Sr and Zn, as taught for instance in U.S. Pat. No. 6,228,535. In the present disclosure the terms "cathode active materials", "nickel hydroxide active materials", "nickel hydroxide materials", "active materials", "materials" and the like are interchangeable and all refer to modified nickel hydroxide. In modified nickel hydroxides, nickel generally is present at an atomic percent of the other metals combined.

The cathode active materials of the invention are for example arrived at via judicious selection of modifiers and theft levels. The present active materials may also be arrived at via judicious selection of preparation process conditions and methods. The present active materials may be arrived at via judicious selection of additives, binders or further processing conditions of an electrode. Further processing conditions includes electrode preparation conditions such as annealing, electrodeless plating, surface coating by physical vapor deposition, surface coating by wet chemical dipping, radiation, and also electrochemical processing conditions.

The present active materials may be arrived at through a certain combination of the above conditions, modifiers, additives, processes, etc.

The cathode active materials of the invention may be prepared by conventional techniques, for instance employing two reactors in series involving the formation of a preamine complex as taught for example in U.S. Pat. No. 5,498,403.

Generally, nickel hydroxide particles are prepared via reacting an inorganic nickel salt with an alkali metal hydroxide in a liquid medium maintained at a pH and temperature at which conversion of the nickel salt to insoluble nickel hydroxide occurs. The nickel salt is generally a salt of a mineral acid and is for instance nickel sulfate, nickel nitrate or nickel chloride. The alkali metal hydroxide is for instance NaOH, KOH or LiOH.

For example, U.S. Pat. No. 5,498,403 teaches mixing a nickel sulfate solution with ammonium hydroxide to form an ammonium complex in a first reactor. The complex is sent to a second mixing vessel where it is combined with NaOH to obtain nickel hydroxide.

The active materials of the present invention may be prepared according to U.S. Pat. Nos. 5,788,943 or 6,019,955, which teach subjecting the reaction mixture to ultrasonic energy during the formation of the nickel hydroxide material. For example, the 955 patent teaches preparing a metal nitrate solution containing Ni, Co and Ca ions, treating this solution with ammonium hydroxide to form a precipitate while the reaction mixture is in an ultrasonic bath. The precipitate is collected by filtration and is washed with water and NaOH solution.

The nickel hydroxide materials may also be prepared according to methods described in U.S. Pat. No. 5,348,822.

According to this disclosure, compositional modifiers are incorporated into nickel hydroxide electrode material using, for example, conventional precipitation procedures. Electrolyte ions can be incorporated into the interlamellar regions, for example, during oxidation in alkaline electrolyte solution. Chemical modifiers can be incorporated into non-substitutional sites in the interlamellar regions, for example, by treatment of oxidized nickel hydroxide materials with salt solutions. The incorporation of combinations of compositional modifiers, electrolyte ions and chemical modifiers may be especially useful.

The materials may have non-substitutional incorporation of at least one chemical modifier around the plates of the nickel hydroxide electrode material. The phrase "non-substitutional incorporation", means incorporation into interlamellar sites or at edges of plates. The chemical modifiers are for example chosen from the group consisting of Al, Ba, Ca, Co, Cr, Cu, F, Fe, K, Li, Mg, Mn, Na, Sr and Zn.

Compositional modifiers are for instance selected from the group consisting of metals, metallic oxides, metallic oxide alloys, metal hydrides, and metal hydride alloys. For instance, compositional modifiers include one or more of Al, Bi, Co, Cr, Cu, Fe, In, $LaH_3$, Mn, Ru, Sb, Sn, $TiH_2$, TiO and Zn. Compositional modifiers are incorporated into the material itself.

For instance, oxidized nickel hydroxide is treated with metal nitrate salt solution and with metal hydroxides then precipitated by cathodic deposition from this nitrate solution. In another method, the oxidized nickel hydroxide is treated with metal salt solution with metal hydroxide and then precipitated by subsequent treatment with alkaline solution. Oxidized nickel hydroxide material may be prepared by electrochemical oxidation in alkaline solution or by treatment with a suitable chemical oxidant such as hydrogen peroxide or sodium hypochlorite.

For example, materials of to the present invention may be prepared by first oxidizing nickel hydroxide electrode material so that many of the nickel ions are in the 3+ state. The nickel hydroxide electrode material is then treated with a cation solution, such as by dipping, rinsing or spraying. The treated material is then reduced. As a result, chemical modifiers are non-substitutionally incorporated around the plates of the nickel hydroxide electrode material. This reaction can be accomplished electrochemically or chemically.

A chemical method, for example could be accomplished by placing electrode powder in an oxidizing solution, treating the oxidized powder with a cation solution and triggering the oxidation of the treated powder using hot water. The resulting powder could then be pasted onto a foamed nickel substrate. An electrochemical method could be accomplished by oxidizing formed nickel hydroxide material electrochemically, dipping the oxidized material in a cation solution and using a current to trigger the oxidation reaction. Variations of these methods such as a chemical oxidation and an electrochemical reduction or a electrochemical reduction and a chemical reduction are taught.

Methods also include activation methods that involve an increase in current density, a pulsed or intermittent charge/discharge treatment or a combination thereof.

Materials of to the present invention may also be prepared via a step of combining with an electrolyte which electrolyte comprises at least one element chosen from the group consisting of Ba, Ca, Cs, K, Na, Ra, Rb and Sr, combined with at least one member of the group consisting of Br, Cl, F and OH. Particular examples of such electrolytes include formulations comprising KOH and CsF and KOH and CsOH.

The cathode active materials may also be prepared by the single-reactor combining nucleation and growth of $Ni(OH)_2$ fine particulates as disclosed in U.S. Pat. No. 6,086,843. This method comprises combining a nickel ion solution, an ammonium hydroxide solution and an alkali metal hydroxide to form a reaction mixture; and cycling the supersaturation of the reaction mixture.

Nickel hydroxide material may be prepared by combining a nickel ion solution with an alkali metal hydroxide. The reaction between the nickel ion solution and the alkali metal hydroxide results in the precipitation of the nickel hydroxide. The nickel hydroxide precipitate may be isolated, washed and dried. The nickel ion solution may be a nickel salt solution. The nickel salt solution may be a nickel nitrate solution, a nickel sulfate solution, a nickel chloride solution or mixtures thereof.

For instance, nickel hydroxide material is prepared by combining the nickel ion solution with an ammonium hydroxide solution so that a nickel-ammonium complex is formed. When the nickel-ammonium complex reacts with the alkali metal hydroxide, a spherically-shaped nickel hydroxide precipitate is grown.

The reaction between the nickel ion solution, the alkali metal hydroxide and the ammonium hydroxide solution may be carried out simultaneously in a single reactor vessel. Alternatively, the nickel ion solution and the ammonium hydroxide solution are premixed together in a first reactor vessel to form the nickel-ammonium complex. The nickel-ammonium complex is then mixed with the alkali metal hydroxide in a second reactor vessel to form the reaction mixture having a nickel hydroxide precipitate. In general, the method of producing the nickel hydroxide is not limited to a specific number of reaction vessels.

This method includes the step of cycling the supersaturation of the reaction mixture that is formed by combining the nickel ion solution, ammonium hydroxide solution, and the alkali metal hydroxide. Generally, a solution is "saturated" when it contains the maximum amount of solute permitted by its solubility at specified conditions. Saturation is an equilibrium condition. A solution is "supersaturated" when it contains a concentration of solute in excess of that found in a saturated solution.

The "supersaturation" of a solution is the difference between the concentration of solute in solution at any instant of time and the equilibrium concentration in a saturated solution of the same solute. Supersaturation is a nonequilibrium condition and leads to precipitation as the reaction mixture attempts to relieve itself toward the equilibrium condition of saturation. The "relative supersaturation" is defined herein as the supersaturation divided by the equilibrium concentration of the solute.

The supersaturation of the reaction mixture may be cycled in various ways. The supersaturation can be varied by either changing the concentration of solute in solution at any instant of time or by changing the equilibrium concentration in a saturated solution of the same solute. Hence, the supersaturation may be cycled by altering the pH, temperature and/or pressure of the reaction mixture. The supersaturation may also be cycled by altering the concentrations of the reagents of the reaction mixture.

A preferred way of cycling the supersaturation is by cycling the pH of the mixture. The pH of the reaction mixture may be cycled by cycling the volumetric amount of the alkali metal hydroxide solution added to the mixture.

This may be done by cycling the flow of alkali metal hydroxide solution into the reaction mixture. This changes the pH of the reaction mixture in a continuous, cyclic fashion, thereby cycling the supersaturation. As the volumetric amount of the alkali metal hydroxide solution is increased, the pH of the mixture increases, and as the volumetric amount of the sodium hydroxide solution is decreased, the pH of the mixture decreases.

It is believed that cycling the supersaturation of the reaction mixture changes the relative rates of nucleation and particle growth of the nickel hydroxide precipitate. Nucleation is a process which leads to the smallest particles that are capable of spontaneous growth. These minimum sized particles are called nuclei. For nucleation to start, a minimum number of ions or molecules must collect together, thus producing the starting nuclei for the particles. Generally, the rate at which these nuclei form increases with an increase in supersaturation. It is believed that the rate of nucleation may increase exponentially with the supersaturation of the reaction mixture. Particle growth is the growth of the nuclei that are already present in the reaction mixture. It is believed that particle growth may be directly proportional to the supersaturation of the reaction mixture.

As discussed above, a preferred way of cycling the supersaturation is to change the pH of the solution. Increasing the pH increases the supersaturation of the reaction mixture. At higher pH values, the nickel hydroxide precipitation is in the "nucleation regime" whereby the ratio of the nucleation rate to growth rate is high. In this regime precipitation predominately forms many small crystallite nuclei and little crystalline growth on the nuclei occurs. On the other hand, decreasing the pH decreases the supersaturation of the reaction mixture. At lower pH values, the precipitation is in the so called "growth" regime whereby the ratio of nucleation rate to particle growth rate is low. In this regime, few nuclei are formed and precipitation predominately causes growth of the previously formed crystallite nuclei.

Hence, as the pH of the precipitation reaction mixture is cycled, cycling also occurs between the growth phase and nucleation phase of the reaction continuum causing continuous variation in the ratio of the nucleation rate relative to the growth rate of the forming nickel hydroxide particles. It is believed that this continuous variation in the relative rates of nucleation and growth creates internal imperfection and disorder and imparts a unique microstructure and macrostructure of the nickel hydroxide material.

The method according to U.S. Pat. No. 6,086,843 produces a structurally modified nickel hydroxide material. The nickel hydroxide prepared is in the form of substantially spherical particles having microstructural and macrostructural modifications. "Macrostructural modification" is defined as the modification of one or more of the "macrostructural parameters" of the material. The macroscopic parameters of the material include pore area, pore volume, pore diameter, pore shape, pore distribution, average particle size, average particle shape, particle size distribution, BET surface area, and tap density. "Microstructural modification" is defined as the modification of one or more of the microscopic parameters of the material. The microscopic parameters of the material include, but are not limited to crystallite size, crystallite shape and crystal lattice as determined by X-ray diffraction data.

The present active materials may be prepared by methods disclosed in U.S. Pat. No. 6,177,213. These methods comprise combining a nickel ion solution, a caustic solution and a conductive material, whereby a precipitation solution including a composite positive electrode material is formed.

The combining step may comprise the steps of mixing a conductive material with a nickel ion solution to form a suspension; and mixing the suspension with a caustic solution. These methods also comprise combining a nickel ion solution, a caustic solution and nucleating particles, whereby a precipitation solution including a composite positive electrode material is formed. The combining step may comprise mixing a nickel ion solution and nucleating particles, thereby forming a suspension of the nucleating particles in the nickel ion solution; and mixing the caustic solution with the suspension.

Composite positive electrode materials prepared according to U.S. Pat. No. 6,177,213 comprise a particle of positive electrode material and a conductive material and/or nucleating particles at least partially embedded within the particle of positive electrode material. The general method for making the composite material is by precipitation of a positive electrode material onto a conductive material suspended in a precipitation bath.

The method requires providing a source of nickel ion solution, a source of a conductive material and a source of caustic (sodium hydroxide). Generally, the method comprises combining the nickel ion solution, the caustic solution and the conductive material so that a precipitation solution which includes the composite positive electrode material is formed. The nickel ion solution optionally includes other metal ions to modify and enhance the performance of the nickel hydroxide material. The nickel ion solution may further comprise for example one or more metal ions selected from the group consisting of Al, Ba, Bi, Ca, Co, Cr, Cu, Fe, In, K, La, Li, Mg, Mn, Na, Nd, Pb, Pr, Ru, Sb, Sc, Se, Sn, Sr, Te, Ti, Y and Zn. The nickel ion solution may be selected from the group consisting of a sulfate solution, a nitrate solution and mixtures thereof.

The caustic solution is generally a very concentrated sodium hydroxide solution as is standard in the art of nickel hydroxide precipitation. As with prior art precipitation processes, the sodium hydroxide can be partially replaced by hydroxides of other alkali metal hydroxides.

For example, the method of producing the composite nickel hydroxide material comprises the mixing a conductive material with the nickel ion solution to form a suspension.

The suspension is then mixed with the caustic solution in a reactor vessel. Hence, in this embodiment, the conductive material is suspended in the nickel ion solution before being mixed with the caustic.

The conductive material comprises for example nickel particles in the form of spheres, spheroids, cylinders or fibers. Once suspended in the nickel ion solution, the conductive particles act as nucleation sites for the precipitation of the nickel hydroxide material. After the suspension is formed, the caustic solution is then mixed with the suspension to precipitate the nickel hydroxide material onto the conductive particle, thereby forming the deposit. As the nickel hydroxide deposits onto the conductive particle, the conductive particle becomes at least partially embedded in the nickel hydroxide material.

The conductive material may comprise one or more additives selected from the group consisting of Ni, Ni alloys, Cu, Cu alloys, carbon, graphite, copper oxide, cobalt oxide, indium tin oxide, oxides, nitrides, carbides, silicides and borides. Nucleating particles may be conductive or non-conductive and include the conductive materials such as Ni particles.

One aspect of the process is to add the conductive particles to the reactor vessel by first suspending them in the nickel ion solution, for example a nickel sulfate solution. When added in this manner, nucleation and precipitation proceed well. Alternatively, the conductive particles may be directly introduced to the precipitation reactor.

A source of ammonium hydroxide is also provided. The ammonium hydroxide is mixed with the nickel ion solution to form an amine complex with the metal ions. The amine complex is then reacted with the caustic solution to form the nickel hydroxide material. The step of mixing the ammonium hydroxide solution with the metal ion solution may occur before or concurrently with the step of mixing the nickel ion solution and the conductive particles. The step of mixing the ammonium hydroxide solution with the nickel ion solution may also occur after the step of mixing the nickel ion solution and the conductive particles, but prior to the step of mixing the caustic solution with the suspension. Further, the step of mixing the ammonium hydroxide solution with the nickel ion solution may occur concurrent with the step of mixing the caustic solution with the suspension.

The method may further comprise separating the composite positive electrode material from the precipitation solution. The composite positive electrode material may be washed with deionized water and/or caustic solution.

The concentrations of the solutions in these processes are variable. The conductive particles may form from about 0.1% to about 35% by weight or from about 2% to about 10% by weight of the final nickel hydroxide powder.

The cathode active materials may advantageously be prepared by methods disclosed for example in U.S. Pat. No. 6,228,535. These methods employ a continuously stirred tank reactor (CSTR) concept. For example, present active materials may be prepared via reacting a metal sulfate mixture ($MeSO_4$), a metal nitrate mixture ($MeNO_3$), $NH_4OH$ and $NaOH$ in a single reactor, maintaining the reactor at a constant temperature of from about 20° C. to about 100° C., from about 40° C. to about 80° C. or from about 50° C. to about 70° C., agitating the combination at a rate of from about 400 to about 1000 rpm, from about 500 to about 900 rpm or from about 700 to about 800 rpm and controlling the pH to from about 9 to about 13, from about 10 to about 12 or from about 10.5 to about 12.0 and controlling both the liquid phase and vapor phase ammonia concentration.

Metals of $MeSO_4$ in this process include Ni and one or more optional modifiers for instance selected from Co, Zn, Mg, Cu, Mn, Al, Bi, Cr, Fe, In, La, Y (and other rare earths), Ru, Sb, Sn, Ti, Ba, Si and Sr. $MeNO_3$, if desired, includes metals such as Ca.

The $MeSO_4$ solution is formulated by mixing from about 3 to about 30 weight percent (wt %), from about 5 to about 25 wt % of from about 7 to about 12 wt % $NiSO_4$ with other sulfate solutions containing the desired metal(s). Overall, the metal sulfate solution added to the reactor is from about 0.5 to about 10 M (molar), from about 1 to about 7 M or from about 2 to about 5 M. The $NH_4OH$ solution added to the reactor is from about 2 to about 30 M, from about 5 to about 20 M or from about 8 to about 15 M. The NaOH solution added to the reactor is from about 5 to about 50 wt %, from about 8 to about 40 wt % or from about 15 to about 30 wt %. Deionized water is employed for the solutions.

The pH of the mixture in the reactor is controlled. This is accomplished for instance via addition of a base as needed, for instance KOH or NaOH solutions, for example about 20 to about 60 wt % KOH or NaOH solutions. Agitation is performed for instance via stirring, agitating or ultrasonication.

In order to incorporate Ca, if desired, into the bulk of the nickel hydroxide active material, it is advantageous to prepare a separate solution of $Ca(NO_3)_2$, $CaCl_2$ or the like and to introduce the solution to the reactor independently. The calcium solutions are for instance from about 0.5 to about 20 wt %, from about 2 to about 15 wt % or from about 11 to about 18 wt % solutions in water.

This process is a continuous precipitation process, therefore it is necessary to control the addition of each of the components and the removal of the slurry product as complimentary rates so that the slurry contains the maximum amount of precipitate product and the minimum amount of unreacted components. Once the slurry is drawn off, it is filtered to collect the precipitate product.

Cathode active materials may be prepared as taught in U.S. Pat. No. 7,396,379. This disclosure teaches for instance combining a metal sulfate solution, ammonium hydroxide, NaOH and an oxidant in a reactor, maintaining the temperature to from about 20° C. to about 100° C., from about 40° C. to about 80° C. or from about 50 to about 70° C., agitating the mixture at a rate of from about 400 to about 1000 rpm, from about 500 to about 900 rpm or from about 700 to about 850 rpm, controlling the pH at from about 9 to about 13, from about 10 to about 12 or from about 10.5 to about 12.0 and controlling the liquid and vapor phase ammonia concentration. The process provides partially oxidized nickel hydroxide.

Modifiers are for instance one or more metals selected from the group consisting of Al, Ba, Bi, Ca, Co, Cr, Cu, F, Fe, In, K, La, Li, Mg, Mn, Na, Nd, Pb, Pr, Ru, Sb, Sc, Se, Sn, Sr, Te, Ti, Y and Zn.

For instance, present cathode active materials are nickel hydroxide materials of formula $(Ni,Me)(OH)_2$ where Me is one or more metals selected from the group consisting of Al, Ba, Bi, Ca, Co, Cr, Cu, F, Fe, In, K, La, Li, Mg, Mn, Na, Nd, Pb, Pr, Ru, Sb, Sc, Se, Sn, Sr, Te, Ti, Y and Zn; and Ni is present at a level of ≥50, ≥55, ≥60 or ≥65 atomic percent, based on the total of Ni plus metals Me.

Suitable modified nickel hydroxide materials include $(Ni,Co,Zn)(OH)_2$, $(Ni,Co)(OH)_2$, $(Ni,Co,Al)(OH)_2$ and $(Ni,Co,Zn,Al)(OH)_2$.

For instance, modified nickel hydroxide materials include $(Ni,Co)(OH)_2$ where Ni is present from about 89 atomic percent (at %) to about 99 at % and Co is present from about 1 at % to about 11 at %, based on 100 at % total of Ni and Co combined. For instance, Ni is about 90, about 91, about 92, about 93, about 94, about 95, about 96, about 97 or about 98 at % and Co is about 2, about 3, about 4, about 5, about 6, about 7, about 8, about 9 or about 10 at %, based on 100 at % total of Ni and Co combined.

For instance, suitable nickel hydroxide active materials include $(Ni,Co,Al)(OH)_2$ where Ni is present from about 80 at % to about 90 at % and Co and Al together are from about 10 to about 20 at %, based on 100 at % total of Ni, Co and Al combined. For instance, Ni is about 81, about 82, about 83, about 84, about 85, about 86, about 87, about 88 or about 89 at % and Co and Al combined are about 11, about 12, about 13, about 14, about 15, about 16, about 17, about 18 or about 19 at %, based on 100 at % total of Ni, Co and Al.

Suitable nickel hydroxide active materials include $(Ni,Co,Zn,Al)(OH)_2$ where Ni is present from about 64 to about 74 at % and Co, Zn and Al together are present from about 26 to about 36 at %, based on 100 at % total of Ni, Co, Zn and Al combined. For example, Ni is present at about 65, about 66, about 67, about 68, about 69, about 70, about 71, about 72 or about 73 at % and Co, Zn and Al together are present at about 27, about 28, about 29, about 30, about 31, about 32, about 33, about 34 or about 35 at %, based on 100 at % total of Ni, Co, Zn and Al combined.

The atomic ratio of Co to Al in present active materials containing both is for instance from about 1:10 to about 10:1, for example about 1:9, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1 or about 9:1. For example, the atomic ratio of Co to Al is from about 1:1 to about 1:5 or from about 1:2 to about 1:4.

The atomic ratio of Co to Zn in the present active materials containing both is for instance from about 1:10 to about 10:1, for example about 1:9, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1 or about 9:1. For example, the atomic ratio of Co to Zn is from about 1:2 to about 2:1 or from about 1:1.5 to about 1.5:1.

The atomic ratio of Zn to Al in the present active materials containing both is for instance from about 1:10 to about 10:1, for example about 1:9, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1 or about 9:1. For example, the atomic ratio of Zn to Al is from about 1:1 to about 1:5 or from about 1:2 to about 1:4.

Present modified nickel hydroxide materials include for example $Ni_{0.94}Co_{0.06}(OH)_2$, $Ni_{0.85}Co_{0.05}Al_{0.10}(OH)_2$ and $Ni_{0.69}Co_{0.05}Zn_{0.06}Al_{0.2}(OH)_2$.

The nickel hydroxide active electrode materials are in particulate form. The particles are generally in the form of spheres or spheroids. The particles are for example substantially spherical, for instance micron scaled spheres. The spheres are for instance from about 0.1 to about 100 microns on average, from about 1 to about 80 microns, from about 2 to about 60 microns, from about 3 to about 50 microns, from about 4 to about 40 microns, from about 5 to about 30 microns or from about 5 to about 20 microns on average.

For instance the nickel hydroxide active materials are in the form of spherical particles with an average size of from about 1 to about 10 microns, from about 5 to about 20, from about 10 to about 15, from about 3 to about 8 microns or from about 3 to about 5 microns. The particulate collected from a certain process may be sieved to arrive at the desired particle size.

Particle size is measured by the largest radii, which for spheres is the diameter. The largest radii of other shapes may also be from about 0.1 to about 100 microns on average.

The nickel hydroxide active materials may comprise particles formed of fine crystallites averaging from about 70 to about 160 angstroms along the largest radii. For instance the crystallite size is from about 50 to about 150 angstroms, from about 60 to about 130 or from about 70 to about 120 angstroms. The crystallite size may be about 80, about 90 about 100, about 110 or about 140 and sizes in between. The crystallite size is defined according to Scherrer's equation using the full-width at half-maximum (FWHM) of one particular reflection peak, namely the (101) direction, of the X-ray diffraction pattern for the nickel hydroxide powder sample. This crystallite size may not correlate directly to the physical dimension of the fine crystals which make up the entire powder due to line broadenings from strains, trapped water and/or other ions, local compositional disorder and other factors.

The nickel hydroxide particles may advantageously have high tap density of $\geq 1.8$ g/cc, $\geq 1.9$ g/cc, $\geq 12.0$ g/cc, $\geq 2.1$ g/cc or $\geq 2.2$ g/cc. The tap density of the cathode active materials may be from about 1 to about 30 g/cc.

The nickel hydroxide particles may advantageously have a high loading density, for example $\geq 2.7$ g/cc. Active material loading is crucial to the energy density of the overall positive electrode and thus the overall batteries.

The active material may have a BET (Brunauer-Emmett-Teller) surface area which is for instance $\geq 14$ m$^2$/g, $\geq 17$ m$^2$/g or $\geq 20$ m$^2$/g.

The active material may also have a pore area which is $\geq 0.5$ m$^2$/g, $\geq 1.0$ m$^2$/g or $\geq 1.5$ m$^2$/g.

The pore volume of the cathode active material is for example $\geq 0.02$ cm$^3$/g, $\geq 0.025$ cm$^3$/g or $\geq 0.03$ cm$^3$/g.

It is proposed that $Ni^{+1}$ is able to participate in electrochemical reactions when using the present cathode active materials. Thus, it is possible that up to 2.3 electrons, up to 2.5 electrons or more may be transferred per Ni atom under electrochemical conditions.

Present nickel hydroxide active cathode materials are capable of transferring >1.3 electrons per Ni atom under reversible electrochemical conditions. For example, present cathode materials are capable of transferring $\geq 1.4$, $\geq 1.5$, $\geq 1.6$, $\geq 1.7$, $\geq 1.8$, $\geq 1.9$, $\geq 2.0$, $\geq 2.1$, $\geq 2.2$, $\geq 2.3$, $\geq 2.4$ or $\geq 2.5$ electrons per Ni atom under reversible electrochemical conditions.

The specific capacity of the present nickel hydroxide active materials is for example $\geq 325$ mAh/g. For instance, the specific capacity of present nickel hydroxide active materials is $\geq 330$ mAh/g, $\geq 335$ mAh/g, $\geq 340$ mAh/g, $\geq 350$ mAh/g, $\geq 360$ mAh/g, $\geq 370$ mAh/g, $\geq 380$ mAh/g, $\geq 390$ mAh/g, $\geq 400$ mAh/g, $\geq 420$ mAh/g, 440 mAh/g, $\geq 460$ mAh/g, $\geq 480$ mAh/g, $\geq 500$ mAh/g, $\geq 520$ mAh/g, $\geq 540$ mAh/g, $\geq 560$ mAh/g, $\geq 580$ mAh/g, $\geq 600$ mAh/g, $\geq 620$ mAh/g or $\geq 630$ mAh/g.

The cathode active materials of this invention exhibit an additional discharge plateau near 0.8 V vs. a metal hydride anode, for example vs. an AB$_5$ MH anode in an alkaline rechargeable cell. The term "near" means "at about", for example plus or minus 1%, 2%, 3%, 4%, 5%, 6%, 7%, 8%, 9% or 10%.

A plateau is a clear horizontal inflection observed in a voltage vs. time discharge curve. A plateau may be just that—planar and deviating only a few mV from horizontal if at all. A plateau may also deviate from horizontal for instance up to 1, up to 3, up to 5, up to 10, up to 20, up to 50 or up to 100 mV per one electron transfer per Ni atom.

A positive electrode is prepared from a positive electrode composition. The positive electrode composition comprises a nickel hydroxide material and optionally one or more components selected from binders and additives.

For instance, the electrode compositions may contain additives such as cobalt compounds, zinc compounds, rare earth compounds or carbon materials. Carbon materials are for instance graphite, graphene, cokes or carbon black.

Present nickel hydroxide positive electrodes may be for example sintered or pasted.

In general, sintered positive electrodes are constructed by applying a nickel powder slurry to a nickel-plated steel base followed by sintering at high temperature. This process causes the individual particles of nickel to weld at their points of contact resulting in a porous material that is approximately 80% open volume and 20% solid metal. This sintered material is then impregnated with active material by soaking it in an acidic solution of nickel nitrate, followed by conversion to nickel hydroxide by reaction with an alkali metal hydroxide. After impregnation, the material is subjected to electrochemical formation.

At present, sintered, foamed or pasted nickel hydroxide positive electrodes are used in NiCd and NiMH cells. The process of making sintered electrodes is well known in the art. Conventional sintered electrodes normally have an energy density of around 480-500 mAh/cc.

Pasted electrodes may comprise nickel hydroxide particles in contact with a conductive substrate and can be made by dry-paste without binder or wet-paste with binder. Pasted electrodes are simple to manufacture, for instance by applying a paste comprising active nickel hydroxide particles to a conductive substrate, followed by roll pressing.

The conductive substrate relates to any electrically conductive support for an electrode active material. It may be in the form of a foam, grid, screen, mesh, matte, plate, fiber, foil, expanded metal or any other type of support structure. It may take the form of conventional nickel foils, plates and foams, as well as carbon networks, fibers or particulate and cobalt oxyhydroxide networks. It may be made from any electronically conductive material, for example nickel, nickel alloys, copper and copper alloys. For instance, the conductive substrate is nickel, a nickel alloy, nickel plated steel or nickel plated copper. For example the conductive substrate is a nickel foam. Foamed and pasted electrodes can be manufactured with an energy density of about 600 mAh/cc.

Suitable polymeric binders are taught for example in U.S. Pat. Nos. 5,948,563, 6,171,726, 6,573,004, 6,617,072 and U.S. Pub. No. 2011/0171526.

The polymeric binder is for example a thermoplastic organic polymer, for instance selected from the group consisting of polyvinyl alcohol (PVA), polyethylene oxide, polypropylene oxide, polybutylene oxide, methyl cellulose, carboxymethyl cellulose, hydroxyethyl cellulose, hydroxypropyl cellulose, hydroxypropylmethyl cellulose, polyethylene, polypropylene, polylsobutylene, polyvinyl chloride, polyvinyliden chloride, polyvinylidene fluoride, polytetrafluoroethylene (PTFE), fluorinated ethylene propylene (FEP), perfluroalkoxy (PFA), polyvinylacetate, polyvinyl isobutylether, polyacrylonitrile, polymethacrylonitrile, polymethylmethacrylate, polymethylacrylate, polyethylmethacrylate, allyl acetate, polystyrene, polybutadiene, polyisoprene, polyoxymethylene, polyoxyethylene, polycyclic thioether, polydimethylsiloxane, polyesters such as polyethylene terephthalate, polycarbonate and polyamide. Blends and copolymers of the above are also suitable.

The polymeric binder may also be an elastomer or rubber such as styrene-butadiene copolymer, styrene-butadiene-styrene block copolymer, styrene-isoprene block copolymer, styrene-isoprene-styrene block copolymer, styrene-ethylene-styrene-butadiene block copolymer, styrene-ethylene-butadiene-styrene block copolymer or styrene-acrylonitrile-butadiene-methyl acrylate copolymer.

The binders for instance may have an average molecular weight, Mw, of ≤30,000, for example from about 2,000 to about 35,000 g/mol, for instance from about 2,500 to about 30,000 g/mol, from about 5,000 to about 28,000 g/mol or from about 10,000 to about 26,000 g/mol.

The positive electrode compositions comprise for instance from about 75 to about 99.8 weight percent (wt %) electrode active material, from about 0.2 to about 10 wt % polymeric binder and from 0 to about 24.8 wt % additives, based on the weight of the electrode composition.

For example, the polymeric binders are present in the electrode compositions at weight levels of about 0.2, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0 or about 2.1 wt %, based on the weight of the electrode composition.

Alternatively, when the conductive substrate is a nickel foam, the electrode composition may contain no binder. The electrode composition may contain only electrode active material and optional additives. In this case, the positive electrode compositions comprise for instance from about 75 to 100 wt % electrode active material and from 0 to about 25 wt % additives.

The positive electrode compositions may comprise additives. For instance, the electrode compositions may contain additives such as cobalt compounds, zinc compounds, rare earth compounds or carbon materials. Carbon materials are for instance graphite, graphene, cokes or carbon black.

The positive electrode compositions may also comprise an appropriate viscosity thickener. Thickeners are for instance cellulosic polymers, salts thereof, polyacrylic acid or polymethacrylic acid or salts thereof and the like. Thickeners may be present in the electrode composition at a level of from about 0.2 wt % to about 1.5 wt %, based on the weight of the composition.

The paste may be a dry paste, comprising the electrode composition and no solvent. Alternatively, the paste may contain the components of the electrode composition and a solvent selected from water, organic solvents and combinations thereof.

Solvents include for instance water and organic solvents such as N-methylpyrrolidone, xylene, toluene, acetone, methanol, ethanol, i-propanol, n-propanol, methylethylketone, cyclohexane, heptane, hexane, tetrahydrofuran and the like.

The polymeric binder may be dissolved, partially dissolved or insoluble in the aqueous or organic solvent. After a paste slurry is applied (pasted) to a conductive substrate, it is typically dried to remove the solvent. The slurry may be allowed to dry at room temperature or may be dried at temperatures up to for instance about 60° C., 70° C., 80° C. or 90° C. Drying may be performed in an oven. The minimum time required for drying is that which results in complete removal of water and/or organic solvent.

After pasting and drying, the electrode may be formed in a press mold or with a roll press or calendar or similar device to achieve the final desired thickness (pressing step). A suitable thickness is for instance from about 21 mil to about 33 mil.

The "application step" is identical to the "pasting step".

The present positive electrodes comprising the nickel hydroxide active materials are for use in an alkaline rechargeable electrochemical cell. The electrochemical cells are for example NiMH, NiCd, NiZn, NiFe or Ni hydrogen cells.

The rechargeable alkaline cells comprise at least one negative electrode, at least one present positive electrode, a casing having said electrodes positioned therein, a separator separating the negative and positive electrodes and an alkaline electrolyte in contact with the electrodes.

The negative electrode (anode) for example comprises a metal hydride (MH) alloy capable of reversibly charging and discharging hydrogen. The active material of an MH alloy comprises an $AB_x$ type alloy capable of storing hydrogen where x is from about 0.5 to about 5.5. A is a hydride forming element and B is a weak or non-hydride forming element. The alloys are capable of reversibly absorbing and desorbing hydrogen. Suitable alloys are for instance taught in U.S. Pat. Nos. 4,623,597, 5,096,667, 5,536,591, 5,840, 440, 6,270,719, 6,536,487, 8,053,114, 8,124,281, 7,829,220, 8,257,862 and 8,409,753 and U.S. Pub. Nos. 2013/0277607 and 2006/057019.

The $AB_x$ type alloys are for example of the categories (with simple examples), AB (HfNi, TiFe, TiNi), $AB_2$ ($ZrMn_2$, $TiFe_2$), $A_2B$ ($Hf_2Fe$, $Mg_2Ni$), $AB_3$ ($NdCo_3$, $GdFe_3$), $A_2B_7$ ($Pr_2Ni_7$, $Ce_2Co_7$) and $AB_5$ ($LaNi_5$, $CeNi_5$).

The electrolyte is in general an aqueous alkaline electrolyte comprising KOH, for instance 30% by weight aqueous KOH.

A separator may be present which separates the negative electrodes from the positive electrodes. The separator is for instance a nonwoven web of natural or synthetic fibers. Natural fibers include cotton. Synthetic fibers include polyamide, polyester, polypropylene (PP), polyethylene (PE), PP/PE copolymer, polytetrafluoroethlene (PTFE), polyvinylchloride and glass.

Present rechargeable alkaline cells can be either vented cells or sealed cells. During normal operation, a vented cell typically permits venting of gas to relieve excess pressure as part of the normal operating conditions. In contrast, a sealed cell generally does not permit venting. As a result of this difference, the vent assemblies and the amounts of electrolyte in the cell container relative to the electrode geometry differ.

Vented cells operate in a "flooded condition." The term "flooded condition" means that the electrodes are completely immersed in, covered by and wetted by the electrolyte. Thus, such cells are sometimes referred to as "flooded cells." A vented cell is typically designed for very low operating pressures of only a few pounds per square inch after which excess pressures are relieved by a vent mechanism.

In contrast, sealed cells are designed to operate in a "starved" electrolyte configuration, that is, with only a minimum amount of electrolyte necessary to permit gas recombination. The enclosure for a sealed cell is normally metallic and the cell may be designed for operation up to about 100 psi absolute or higher. Because they are sealed, such cells do not require periodic maintenance.

Typically, a sealed rechargeable alkaline cell for use in consumer appliances, such as a C cell, uses a cylindrical nickel-plated steel case as the negative terminal and the cell cover as the positive terminal. An insulator separates the positive cover from the negative cell can. The electrodes are wound to form a compact "jelly roll" with the electrodes of opposite polarity isolated from each other by a porous, woven or non-woven separator of for instance nylon or polypropylene. A tab extends from each electrode to create a single current path through which current is distributed to the entire electrode area during charging and discharging. The tab on each electrode is electrically connected to its respective terminal.

In sealed cells, the discharge capacity of a nickel based positive electrode is limited by the amount of electrolyte, the amount of active material, and the charging efficiencies. The charge capacities of a NiCd negative electrode and a NiMH negative electrode are both provided in excess, to maintain the optimum capacity and provide overcharge protection. The operational lifespan, that is, the available number of charge and discharge cycles of a sealed cell, typically determines the kinds of applications for which a cell will be useful. Cells that are capable of undergoing more cycles have more potential applications. Thus, longer lifespan cells are more desirable. An additional goal for any type of electrode is to obtain as high an energy density as possible.

Present cells include nickel metal hydride (NiMH), nickel cadmium (NiCd), nickel hydrogen, nickel zinc and nickel iron cells.

The terms "battery" and "cell" are employed interchangeably when referring to one cell; while the term "battery" may also refer to a plurality of electrically interconnected cells.

The electrochemical reaction at the cathode employing nickel hydroxide active materials is known to involve the transfer of one electron, between the stable $Ni^{2+}$ β phase of $Ni(OH)_2$ and the $Ni^{3+}$ β phase of NiOOH. The theoretical specific capacity of nickel hydroxide active material based on this is 289 mAh/g.

During discharge in an electrochemical cell employing a present cathode, there are observed two or three discharge plateaus, assigned to a $^+3.3$ (or higher) to $^+3$ Ni oxidation state transition at >1.2 V and <1.3 V; to the $^+3$ to $^+2$ oxidation state transition at about 1.2 V and to a $^+2$ to $^+1$ (or lower) oxidation state transition at about 0.8 V.

With the present cathode active materials, reversible electrochemical cycling via a $Ni(OH)_2$ α phase and a NiOOH γ phase is possible. The present active materials are capable of transferring more than 1.3, more than 1.5 and even more than 2 electrons per Ni atom during charge/discharge cycling. A specific capacity of much greater than 289 mAh/g is achieved based on nickel hydroxide.

It is proposed that $Ni^{1+}$ is able to participate in electrochemical reactions with the present cathode active materials. It may be that $\alpha$-$Ni(OH)_2$ with $Ni^{1+}$ is formed when a cation such as $K^+$ is trapped in the water intercalation layer and allows the oxidation state of Ni to decrease from $^+2$ to $^+1$ and possibly lower.

During discharge in an electrochemical cell, Ni in the cathode active material may obtain an oxidation state of less than 2.

All measurements herein are determined at 25° C. and atmospheric pressure.

The terms "a" or "an" referring to elements of an embodiment may mean "one" or may mean "one or more".

The term "about" refers to variation that can occur, for example, through typical measuring and handling procedures; through inadvertent error in these procedures; through differences in the manufacture, source, or purity of ingredients used; through differences in methods used; and the like. The term "about" also encompasses amounts that differ due to different equilibrium conditions for a composition resulting from a particular initial mixture. Whether or not modified by the term "about," embodiments and claims include equivalents to the recited quantities.

All numeric values herein are modified by the term "about," whether or not explicitly indicated. The term "about" generally refers to a range of numbers that one of skill in the art would consider equivalent to the recited value (i.e., having the same function and/or result). In many instances, the term "about" may include numbers that are rounded to the nearest significant figure.

A value modified by the term "about" of course includes the specific value. For instance, "about 5.0" must include 5.0.

The term "consisting essentially of" means that the composition, method or structure may include additional ingredients, steps and/or parts, but only if the additional ingredients, steps and/or parts do not materially alter the basic and novel characteristics of the claimed composition, method or structure.

U.S. Patents, U.S. published patent applications and U.S. patent applications discussed herein are each hereby incorporated by reference.

Following are some embodiments of the invention.

E1. A nickel hydroxide cathode active material for use in an alkaline rechargeable electrochemical cell, which active material is capable of transferring >1.3 electrons per Ni atom, for example capable of transferring $\geq 1.4$, $\geq 1.5$, $\geq 1.6$, $\geq 1.67$, $\geq 1.7$, $\geq 1.8$, $\geq 1.9$, $\geq 2.0$, $\geq 2.1$, $\geq 2.2$, $\geq 2.3$, $\geq 2.4$ or $\geq 2.5$ electrons per Ni atom.

E2. A cathode active material according to embodiment 1, where the specific capacity of the material is $\geq 325$ mAh/g, for instance, $\geq 330$ mAh/g, $\geq 335$ mAh/g, $\geq 340$ mAh/g, $\geq 350$ mAh/g, $\geq 360$ mAh/g, $\geq 370$ mAh/g, $\geq 380$ mAh/g, $\geq 390$ mAh/g, $\geq 400$ mAh/g, $\geq 420$ mAh/g, 440 mAh/g, $\geq 460$ mAh/g, $\geq 480$ mAh/g or $\geq 500$ mAh/g, for example, $\geq 520$ mAh/g, $\geq 540$ mAh/g, $\geq 560$ mAh/g, $\geq 580$ mAh/g, $\geq 600$ mAh/g, $\geq 620$ mAh/g or $\geq 630$ mAh/g; this is based on total active material and not $Ni(OH)_2$.

E3. A cathode active material according to embodiments 1 or 2, where Ni reaches an oxidation state of less than $^+2$, $\leq^+1.8$, $\leq^+1.6$, $\leq^+1.4$, $\leq^+1.2$ or $\leq^+1$ during charge/discharge cycling of an alkaline rechargeable cell; in other words Ni may be in these oxidation states at some point during charge/discharge cycling.

E4. A cathode active material according to any of the preceding embodiments, which exhibits a discharge plateau near (at about) 0.8 V vs. a metal hydride anode during charge/discharge cycling of an alkaline rechargeable cell.

E5. A cathode active material according to embodiment 4, which also exhibits a discharge plateau near (at about) 1.2 V and a discharge plateau at >1.2 V and <1.3 V.

E6. A cathode active material according to any of the preceding embodiments comprising one or more modifiers selected from the group consisting of Al, Ba, Bi, Ca, Co, Cr, Cu, F, Fe, In, K, La, Li, Mg, Mn, Na, Nd, Pb, Pr, Ru, Sb, Sc, Se, Sn, Sr, Te, Ti, Y and Zn.

E7. A cathode active material according to any of the preceding embodiments comprising one or more modifiers selected from the group consisting of Co, Zn and Al.

E8. A cathode active material according to any of the preceding embodiments selected from the group consisting of $(Ni,Co,Zn)(OH)_2$, $(Ni,Co)(OH)_2$, $(Ni,Co,Al)(OH)_2$ and $(Ni,Co,Zn,Al)(OH)_2$.

E9. A cathode active material according to embodiment 8 selected from the group consisting of $(Ni,Co)(OH)_2$ nickel hydroxides where Ni is present from about 89 atomic percent (at %) to about 99 at % and Co is present from about 1 at % to about 11 at %, based on 100 at % total of Ni and Co combined, for instance where Ni is about 90, about 91, about 92, about 93, about 94, about 95, about 96, about 97 or about 98 at % and Co is about 2, about 3, about 4, about 5, about 6, about 7, about 8, about 9 or about 10 at %, based on 100 at % total of Ni and Co combined.

E10. A cathode active material according to embodiment 8 selected from the group consisting of $(Ni,Co,Al)(OH)_2$ nickel hydroxides where Ni is present from about 80 at % to about 90 at % and Co and Al together are from about 10 to about 20 at %, based on 100 at % total of Ni, Co and Al combined, for instance, Ni is about 81, about 82, about 83, about 84, about 85, about 86, about 87, about 88 or about 89 at % and Co and Al combined are about 11, about 12, about 13, about 14, about 15, about 16, about 17, about 18 or about 19 at %, based on 100 at % total of Ni, Co and Al.

E11. A cathode active material according to embodiment 8 selected from the group consisting of $(Ni,Co,Zn,Al)(OH)_2$ nickel hydroxides where Ni is present from about 64 to about 74 at % and Co, Zn and Al together are present from about 26 to about 36 at %, based on 100 at % total of Ni, Co, Zn and Al combined, for example, Ni is present at about 65, about 66, about 67, about 68, about 69, about 70, about 71, about 72 or about 73 at % and Co, Zn and Al together are present at about 27, about 28, about 29, about 30, about 31, about 32, about 33, about 34 or about 35 at %, based on 100 at % total of Ni, Co, Zn and Al combined.

E12. A cathode active material according to embodiments 10 or 11 where the atomic ratio of Co to Al is from about 1:10 to about 10:1, for example about 1:9, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1 or about 9:1.

E13. A cathode active material according to embodiments 10 or 11 where the atomic ratio of Co to Al is from about 1:1 to about 1:5 or from about 1:2 to about 1:4.

E14. A cathode active material according to embodiment 11 where the atomic ratio of Co to Zn is from about 1:10 to about 10:1, for example about 1:9, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1 or about 9:1.

E15. A cathode active material according to embodiment 11 where the atomic ratio of Co to Zn is from about 1:2 to about 2:1 or from about 1:1.5 to about 1.5:1.

E16. A cathode active material according to embodiments 11, 14 or 15 where the atomic ratio of Zn to Al is from about 1:10 to about 10:1, for example about 1:9, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1 or about 9:1.

E17. A cathode active material according to embodiments 11, 14 or 15 where the atomic ratio of Zn to Al is from about 1:1 to about 1:5 or from about 1:2 to about 1:4.

E18. A cathode active material according to embodiment 8 selected from the group consisting of $Ni_{0.94}Co_{0.06}(OH)_2$, $Ni_{0.85}Co_{0.05}Al_{0.10}(OH)_2$ and $Ni_{0.69}Co_{0.05}Zn_{0.06}Al_{0.2}(OH)_2$.

Following are more embodiments of the invention.

E1. A nickel hydroxide cathode active material for use in an alkaline rechargeable electrochemical cell, where the specific capacity of the material is $\geq 325$ mAh/g, for instance, $\geq 330$ mAh/g, $\geq 335$ mAh/g, $\geq 340$ mAh/g, $\geq 350$ mAh/g, $\geq 360$ mAh/g, $\geq 370$ mAh/g, $\geq 380$ mAh/g, $\geq 390$ mAh/g, $\geq 400$ mAh/g, $\geq 420$ mAh/g, 440 mAh/g, $\geq 460$ mAh/g, $\geq 480$ mAh/g or $\geq 500$ mAh/g, for example, $\geq 520$ mAh/g, $\geq 540$ mAh/g, $\geq 560$ mAh/g, $\geq 580$ mAh/g, $\geq 600$ mAh/g, $\geq 620$ mAh/g or $\geq 630$ mAh/g; this is based on total active material and not on $Ni(OH)_2$.

E2. A nickel hydroxide cathode active material according to embodiment 1 which is capable of transferring $\geq 1.3$ electrons per Ni atom, for example capable of transferring $\geq 1.4$, $\geq 1.5$, $\geq 1.6$, $\geq 1.7$, $\geq 1.8$, $\geq 1.9$, $\geq 2.0$, $\geq 2.1$, $\geq 2.2$, $\geq 2.3$, $\geq 2.4$ or $\geq 2.5$ electrons per Ni atom.

E3. A cathode active material according to embodiments 1 or 2, where Ni reaches an oxidation state of less than $^+2$, $\leq^+1.8$, $\leq^+1.6$, $\leq^+1.4$, $\leq^+1.2$ or $\leq^+1$ during charge/discharge cycling of an alkaline rechargeable cell; in other words Ni may be in these oxidation states at some point during charge/discharge cycling.

E4. A cathode active material according to any of the preceding embodiments, which exhibits a discharge plateau near (at about) 0.8 V vs. a metal hydride anode during charge/discharge cycling of an alkaline rechargeable cell.

E5. A cathode active material according to embodiment 4, which also exhibits a discharge plateau near (at about) 1.2 V and a discharge plateau at >1.2 V and <1.3 V.

E6. A cathode active material according to any of the preceding embodiments comprising one or more modifiers selected from the group consisting of Al, Ba, Bi, Ca, Co, Cr, Cu, F, Fe, In, K, La, Li, Mg, Mn, Na, Nd, Pb, Pr, Ru, Sb, Sc, Se, Sn, Sr, Te, Ti, Y and Zn.

E7. A cathode active material according to any of the preceding embodiments comprising one or more modifiers selected from the group consisting of Co, Zn and Al.

E8. A cathode active material according to any of the preceding embodiments selected from the group consisting of $(Ni,Co,Zn)(OH)_2$, $(Ni,Co)(OH)_2$, $(Ni,Co,Al)(OH)_2$ and $(Ni,Co,Zn,Al)(OH)_2$ nickel hydroxides.

E9. A cathode active material according to embodiment 8 selected from the group consisting of $(Ni,Co)(OH)_2$ nickel hydroxides where Ni is present from about 89 atomic percent (at %) to about 99 at % and Co is present from about 1 at % to about 11 at %, based on 100 at % total of Ni and Co combined, for instance where Ni is about 90, about 91, about 92, about 93, about 94, about 95, about 96, about 97 or about 98 at % and Co is about 2, about 3, about 4, about 5, about 6, about 7, about 8, about 9 or about 10 at %, based on 100 at % total of Ni and Co combined.

E10. A cathode active material according to embodiment 8 selected from the group consisting of $(Ni,Co,Al)(OH)_2$ nickel hydroxides where Ni is present from about 80 at % to about 90 at % and Co and Al together are from about 10 to about 20 at %, based on 100 at % total of Ni, Co and Al combined, for instance, Ni is about 81, about 82, about 83, about 84, about 85, about 86, about 87, about 88 or about 89 at % and Co and Al combined are about 11, about 12, about 13, about 14, about 15, about 16, about 17, about 18 or about 19 at %, based on 100 at % total of Ni, Co and Al.

E11. A cathode active material according to embodiment 8 selected from the group consisting of $(Ni,Co,Zn,Al)(OH)_2$ nickel hydroxides where Ni is present from about 64 to about 74 at % and Co, Zn and Al together are present from about 26 to about 36 at %, based on 100 at % total of Ni, Co, Zn and Al combined, for example, Ni is present at about 65, about 66, about 67, about 68, about 69, about 70, about 71, about 72 or about 73 at % and Co, Zn and Al together are present at about 27, about 28, about 29, about 30, about 31, about 32, about 33, about 34 or about 35 at %, based on 100 at % total of Ni, Co, Zn and Al combined.

E12. A cathode active material according to embodiments 10 or 11 where the atomic ratio of Co to Al is from about 1:10 to about 10:1, for example about 1:9, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1 or about 9:1.

E13. A cathode active material according to embodiments 10 or 11 where the atomic ratio of Co to Al is from about 1:1 to about 1:5 or from about 1:2 to about 1:4.

E14. A cathode active material according to embodiment 11 where the atomic ratio of Co to Zn is from about 1:10 to about 10:1, for example about 1:9, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1 or about 9:1.

E15. A cathode active material according to embodiment 11 where the atomic ratio of Co to Zn is from about 1:2 to about 2:1 or from about 1:1.5 to about 1.5:1.

E16. A cathode active material according to embodiments 11, 14 or 15 where the atomic ratio of Zn to Al is from about 1:10 to about 10:1, for example about 1:9, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1 or about 9:1.

E17. A cathode active material according to embodiments 11, 14 or 15 where the atomic ratio of Zn to Al is from about 1:1 to about 1:5 or from about 1:2 to about 1:4.

E18. A cathode active material according to embodiment 8 selected from the group consisting of $Ni_{0.94}Co_{0.06}(OH)_2$, $Ni_{0.85}Co_{0.05}Al_{0.10}(OH)_2$ and $Ni_{0.69}Co_{0.05}Zn_{0.06}Al_{0.2}(OH)_2$.

Following are further embodiments of the invention.

E1. A nickel hydroxide cathode active material for use in an alkaline rechargeable electrochemical cell, where the cell exhibits a discharge plateau near (at about) 0.8 V vs. a metal hydride anode during charge/discharge cycling.

E2. A cathode active material according to embodiment 1 which is capable of transferring >1.3 electrons per Ni atom, for example capable of transferring ≥1.4, ≥1.5, ≥1.6, ≥1.7, ≥1.8, ≥1.9, ≥2.0, ≥2.1, ≥2.2, ≥2.3, ≥2.4 or ≥2.5 electrons per Ni atom.

E3. A cathode active material according to embodiments 1 or 2, where the specific capacity of the material is ≥325 mAh/g, for instance, ≥330 mAh/g, ≥335 mAh/g, ≥340 mAh/g, ≥350 mAh/g, ≥360 mAh/g, ≥370 mAh/g, ≥380 mAh/g, ≥390 mAh/g, ≥400 mAh/g, ≥420 mAh/g, 440 mAh/g, ≥460 mAh/g, ≥480 mAh/g or ≥500 mAh/g, for example, ≥520 mAh/g, ≥540 mAh/g, ≥560 mAh/g, ≥580 mAh/g, ≥600 mAh/g, ≥620 mAh/g or ≥630 mAh/g; this is based on total active material and not $Ni(OH)_2$.

E4. A cathode active material according to any of the preceding embodiments, where Ni reaches an oxidation state of less than $^+2$, $\leq^+1.8$, $\leq^+1.6$, $\leq^+1.4$, $\leq^+1.2$ or $\leq^+1$ during charge/discharge cycling of an alkaline rechargeable cell; in other words Ni may be in these oxidation states at some point during charge/discharge cycling.

E5. A cathode active material according to any of the preceding embodiments, which also exhibits a discharge plateau near (at about) 1.2 V and a discharge plateau at >1.2 V and <1.3 V.

E6. A cathode active material according to any of the preceding embodiments comprising one or more modifiers selected from the group consisting of Al, Ba, Bi, Ca, Co, Cr, Cu, F, Fe, In, K, La, Li, Mg, Mn, Na, Nd, Pb, Pr, Ru, Sb, Sc, Se, Sn, Sr, Te, Ti, Y and Zn.

E7. A cathode active material according to any of the preceding embodiments comprising one or more modifiers selected from the group consisting of Co, Zn and Al.

E8. A cathode active material according to any of the preceding embodiments selected from the group consisting of $(Ni,Co,Zn)(OH)_2$, $(Ni,Co)(OH)_2$, $(Ni,Co,Al)(OH)_2$ and $(Ni,Co,Zn,Al)(OH)_2$ nickel hydroxides.

E9. A cathode active material according to embodiment 8 selected from the group consisting of $(Ni,Co)(OH)_2$ nickel hydroxides where Ni is present from about 89 atomic percent (at %) to about 99 at % and Co is present from about 1 at % to about 11 at %, based on 100 at % total of Ni and Co combined, for instance where Ni is about 90, about 91, about 92, about 93, about 94, about 95, about 96, about 97 or about 98 at % and Co is about 2, about 3, about 4, about 5, about 6, about 7, about 8, about 9 or about 10 at %, based on 100 at % total of Ni and Co combined.

E10. A cathode active material according to embodiment 8 selected from the group consisting of $(Ni,Co,Al)(OH)_2$ nickel hydroxides where Ni is present from about 80 at % to about 90 at % and Co and Al together are from about 10 to about 20 at %, based on 100 at % total of Ni, Co and Al combined, for instance, Ni is about 81, about 82, about 83, about 84, about 85, about 86, about 87, about 88 or about 89 at % and Co and Al combined are about 11, about 12, about 13, about 14, about 15, about 16, about 17, about 18 or about 19 at %, based on 100 at % total of Ni, Co and Al.

E11. A cathode active material according to embodiment 8 selected from the group consisting of $(Ni,Co,Zn,Al)(OH)_2$ nickel hydroxides where Ni is present from about 64 to about 74 at % and Co, Zn and Al together are present from about 26 to about 36 at %, based on 100 at % total of Ni, Co, Zn and Al combined, for example, Ni is present at about 65, about 66, about 67, about 68, about 69, about 70, about 71, about 72 or about 73 at % and Co, Zn and Al together are present at about 27, about 28, about 29, about 30, about 31, about 32, about 33, about 34 or about 35 at %, based on 100 at % total of Ni, Co, Zn and Al combined.

E12. A cathode active material according to embodiments 10 or 11 where the atomic ratio of Co to Al is from about 1:10 to about 10:1, for example about 1:9, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1 or about 9:1.

E13. A cathode active material according to embodiments 10 or 11 where the atomic ratio of Co to Al is from about 1:1 to about 1:5 or from about 1:2 to about 1:4.

E14. A cathode active material according to embodiment 11 where the atomic ratio of Co to Zn is from about 1:10 to about 10:1, for example about 1:9, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1 or about 9:1.

E15. A cathode active material according to embodiment 11 where the atomic ratio of Co to Zn is from about 1:2 to about 2:1 or from about 1:1.5 to about 1.5:1.

E16. A cathode active material according to embodiments 11, 14 or 15 where the atomic ratio of Zn to Al is from about 1:10 to about 10:1, for example about 1:9, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1 or about 9:1.

E17. A cathode active material according to embodiments 11, 14 or 15 where the atomic ratio of Zn to Al is from about 1:1 to about 1:5 or from about 1:2 to about 1:4.

E18. A cathode active material according to embodiment 8 selected from the group consisting of $Ni_{0.94}Co_{0.06}(OH)_2$, $Ni_{0.85}Co_{0.05}Al_{0.10}(OH)_2$ and $Ni_{0.69}Co_{0.05}Zn_{0.06}Al_{0.2}(OH)_2$.

Following are further embodiments of the invention.

E1. A nickel hydroxide cathode active material for use in an alkaline rechargeable electrochemical cell, where Ni reaches an oxidation state of less than $^+2$, $\leq^+1.8$, $\leq^+1.6$, $\leq^+1.4$, $\leq^+1.2$ or $\leq^+1$ during charge/discharge cycling of an alkaline rechargeable cell; in other words Ni may be in these oxidation states at some point during charge/discharge cycling.

E2. A nickel hydroxide cathode active material according to embodiment 1 which is capable of transferring >1.3 electrons per Ni atom, for example capable of transferring $\geq 1.4$, $\geq 1.5$, $\geq 1.6$, $\geq 1.7$, $\geq 1.8$, $\geq 1.9$, $\geq 2.0$, $\geq 2.1$, $\geq 2.2$, $\geq 2.3$, $\geq 2.4$ or $\geq 2.5$ electrons per Ni atom.

E3. A cathode active material according to embodiments 1 or 2, where the specific capacity of the material is $\geq 325$ mAh/g, for instance, $\geq 330$ mAh/g, $\geq 335$ mAh/g, $\geq 340$ mAh/g, $\geq 350$ mAh/g, $\geq 360$ mAh/g, $\geq 370$ mAh/g, $\geq 380$ mAh/g, $\geq 390$ mAh/g, $\geq 400$ mAh/g, $\geq 420$ mAh/g, 440 mAh/g, $\geq 460$ mAh/g, $\geq 480$ mAh/g or $\geq 500$ mAh/g, for example, $\geq 520$ mAh/g, $\geq 540$ mAh/g, $\geq 560$ mAh/g, $\geq 580$ mAh/g, $\geq 600$ mAh/g, $\geq 620$ mAh/g or $\geq 630$ mAh/g; this is based on total active material and not $Ni(OH)_2$.

E4. A cathode active material according to any of the preceding embodiments, which exhibits a discharge plateau near (at about) 0.8 V vs. a metal hydride anode during charge/discharge cycling of an alkaline rechargeable cell.

E5. A cathode active material according to embodiment 4, which also exhibits a discharge plateau near (at about) 1.2 V and a discharge plateau at >1.2 V and <1.3 V.

E6. A cathode active material according to any of the preceding embodiments comprising one or more modifiers selected from the group consisting of Al, Ba, Bi, Ca, Co, Cr, Cu, F, Fe, In, K, La, Li, Mg, Mn, Na, Nd, Pb, Pr, Ru, Sb, Sc, Se, Sn, Sr, Te, Ti, Y and Zn.

E7. A cathode active material according to any of the preceding embodiments comprising one or more modifiers selected from the group consisting of Co, Zn and Al.

E8. A cathode active material according to any of the preceding embodiments selected from the group consisting of $(Ni,Co,Zn)(OH)_2$, $(Ni,Co)(OH)_2$, $(Ni,Co,Al)(OH)_2$ and $(Ni,Co,Zn,Al)(OH)_2$ nickel hydroxides.

E9. A cathode active material according to embodiment 8 selected from the group consisting of $(Ni,Co)(OH)_2$ nickel hydroxides where Ni is present from about 89 atomic percent (at %) to about 99 at % and Co is present from about 1 at % to about 11 at %, based on 100 at % total of Ni and Co combined, for instance where Ni is about 90, about 91, about 92, about 93, about 94, about 95, about 96, about 97 or about 98 at % and Co is about 2, about 3, about 4, about 5, about 6, about 7, about 8, about 9 or about 10 at %, based on 100 at % total of Ni and Co combined.

E10. A cathode active material according to embodiment 8 selected from the group consisting of $(Ni,Co,Al)(OH)_2$ nickel hydroxides where Ni is present from about 80 at % to about 90 at % and Co and Al together are from about 10 to about 20 at %, based on 100 at % total of Ni, Co and Al combined, for instance, Ni is about 81, about 82, about 83, about 84, about 85, about 86, about 87, about 88 or about 89 at % and Co and Al combined are about 11, about 12, about 13, about 14, about 15, about 16, about 17, about 18 or about 19 at %, based on 100 at % total of Ni, Co and Al.

E11. A cathode active material according to embodiment 8 selected from the group consisting of $(Ni,Co,Zn,Al)(OH)_2$ nickel hydroxides where Ni is present from about 64 to about 74 at % and Co, Zn and Al together are present from about 26 to about 36 at %, based on 100 at % total of Ni, Co, Zn and Al combined, for example, Ni is present at about 65, about 66, about 67, about 68, about 69, about 70, about 71, about 72 or about 73 at % and Co, Zn and Al together are present at about 27, about 28, about 29, about 30, about 31, about 32, about 33, about 34 or about 35 at %, based on 100 at % total of Ni, Co, Zn and Al combined.

E12. A cathode active material according to embodiments 10 or 11 where the atomic ratio of Co to Al is from about 1:10 to about 10:1, for example about 1:9, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1 or about 9:1.

E13. A cathode active material according to embodiments 10 or 11 where the atomic ratio of Co to Al is from about 1:1 to about 1:5 or from about 1:2 to about 1:4.

E14. A cathode active material according to embodiment 11 where the atomic ratio of Co to Zn is from about 1:10 to about 10:1, for example about 1:9, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1 or about 9:1.

E15. A cathode active material according to embodiment 11 where the atomic ratio of Co to Zn is from about 1:2 to about 2:1 or from about 1:1.5 to about 1.5:1.

E16. A cathode active material according to embodiments 11, 14 or 15 where the atomic ratio of Zn to Al is from about 1:10 to about 10:1, for example about 1:9, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1 or about 9:1.

E17. A cathode active material according to embodiments 11, 14 or 15 where the atomic ratio of Zn to Al is from about 1:1 to about 1:5 or from about 1:2 to about 1:4.

E18. A cathode active material according to embodiment 8 selected from the group consisting of $Ni_{0.94}Co_{0.06}(OH)_2$, $Ni_{0.85}Co_{0.05}Al_{0.10}(OH)_2$ and $Ni_{0.69}Co_{0.05}Zn_{0.06}Al_{0.2}(OH)_2$.

Following are further embodiments of the invention.

E1. A positive electrode for use in an alkaline rechargeable electrochemical cell, the electrode comprising a cathode active material according to any of the prior embodiments of the above 4 set of embodiments, a conductive substrate and optionally one or more components selected from binders and additives.

E2. A positive electrode according to embodiment 1 comprising one or more binders and/or additives.

E3. A positive electrode according to embodiment 1 comprising one or more additives selected from the group consisting of cobalt compounds, zinc compounds, rare earth compounds and carbon materials.

E4. A positive electrode according to any of the preceding embodiments which is a pasted electrode.

E5. A positive electrode according to embodiment 4 comprising a nickel foam conductive substrate.

E6. A rechargeable alkaline cell comprising at least one negative electrode, at least one positive electrode according to any of embodiments 1 to 5, a casing having said electrodes positioned therein, a separator separating the negative and positive electrodes and an alkaline electrolyte in contact with the electrodes.

E7. A rechargeable alkaline cell according to embodiment 6 where the negative electrode comprises a metal hydride alloy capable of reversibly charging and discharging hydrogen.

BRIEF DESCRIPTION OF THE FIGURES

FIG. 1 shows the discharge curves of CAM1 over time.

FIG. 2 is an expansion of the $10^{th}$ cycle of FIG. 1. A discharge plateau at about 0.8 V is observed in addition to the plateau at about 1.2 V (volts). These are assigned respectively to a $^{+}2$ to $^{+}1$ Ni oxidation state transition and to the $^{+}3$ to $^{+}2$ oxidation state transition.

FIG. 3 shows the discharge curves of CAM2 over time.

FIG. 4 is an expansion of the $8^{th}$ cycle of FIG. 3. Observed are three discharge plateaus, assigned to a $^{+}3.3$ (or higher) to $^{+}3$ Ni oxidation state transition; to the $^{+}3$ to $^{+}2$ transition and to a $^{+}2$ to $^{+}1$ (or lower) transition at a discharge plateau of about 0.8 V.

FIG. 5 shows the discharge curves of CAM3 over time.

FIG. 6 is an expansion of the $6^{th}$ cycle of FIG. 5. Observed are the $^{+}3$ to $^{+}2$ Ni oxidation state transition at about 1.2 V and a further discharge plateau at about 0.8 V, assigned to a $^{+}2$ to $^{+}1$ (or lower) oxidation state transition.

EXAMPLES

The following cathode active materials (CAM) are prepared in a continuously stirred tank reactor as taught in U.S. Pat. No. 6,228,535.

| control | $Ni_{0.91}Co_{0.045}Zn_{0.045}(OH)_2$ |
| CAM1 | $Ni_{0.94}Co_{0.06}(OH)_2$ |
| CAM2 | $Ni_{0.85}Co_{0.05}Al_{0.10}(OH)_2$ |
| CAM3 | $Ni_{0.69}Co_{0.05}Zn_{0.06}Al_{0.20}(OH)_2$ |

The cathode active materials (100 mg) are mixed together with carbon black and polytetrafluoroethylene (PTFE) in a weight ratio of 3/2/1. The mixtures are pressed onto both sides of a 0.5×0.5 inch nickel mesh with a hydraulic press under 2 tons pressure for 5 seconds. The nickel mesh substrate contains a nickel mesh tab leading out of the square for a testing connection.

The average particle sizes are 21.5 microns for CAM1, 4.2 microns for CAM2 and 3.9 microns for CAM3. The tap density of the cathode active materials may be from about 1 to about 30 g/cc. The control hydroxide $Ni_{0.91}Co_{0.045}Zn_{0.045}(OH)_2$ has a tap density of 1.90 g/cc and a particle size of 10.0 microns.

Discharge capacities in mAh/g, based on total cathode active material weight relative to cycle number are below. Number of electron transfer per Ni atom are in parentheses.

| cycle | control | CAM1 | CAM2 | CAM3 |
|---|---|---|---|---|
| 1 | 150 (0.6) | 95 (0.4) | 172 (0.7) | 152 (0.7) |
| 2 | 180 (0.7) | 119 (0.4) | 216 (0.9) | 175 (0.8) |
| 3 | 198 (0.8) | 141 (0.5) | 238 (1.0) | 190 (0.9) |
| 4 | 215 (0.8) | 139 (0.5) | 234 (0.9) | 223 (1.0) |
| 5 | 228 (0.9) | 148 (0.6) | 243 (1.0) | 379 (1.8) |
| 6 | 235 (0.9) | 149 (0.6) | 270 (1.1) | 530 (2.5) |
| 7 | 240 (1.0) | 163 (0.6) | 335 (1.3) | 426 (2.0) |
| 8 | 243 (1.0) | 143 (0.6) | 635 (2.5) | 365 (1.7) |
| 9 | 240 (1.0) | 245 (0.9) | 599 (2.4) | 329 (1.5) |
| 10 | 244 (1.0) | 423 (1.6) | 463 (1.8) | 296 (1.4) |
| 11 | 238 (0.9) | 343 (1.3) | 259 (1.0) | 236 (1.1) |

As a control experiment, an electrode is prepared as above using pure carbon black. This electrode does not exhibit electrochemical activity.

The cathodes of the invention exhibit an additional discharge plateau at about 0.8 V vs. an $AB_5$ anode. This is seen in the present figures. Observed are two or three discharge plateaus, assigned to a $^{+}3.3$ (or higher) to $^{+}3$ Ni oxidation state transition; to the $^{+}3$ to $^{+}2$ oxidation state transition and to a $^{+}2$ to $^{+}1$ (or lower) oxidation state transition.

The inventive cathode active materials CAM1, CAM2 and CAM3 are capable of transferring more than 1.3, more than 1.5 and even more than 2 electrons per Ni atom. A specific capacity of much greater than 289 mAh/g is achieved.

The theoretical specific capacity for CAM1 based on the total weight of active material is about 272 mAh/g. For CAM2 it is about 260 mAh/g and for CAM 3 it is about 222 mAh/g. This is calculated from 289 mAh/g times the weight % of $Ni(OH)_2$ of the material. The present specific capacities may be more fairly compared to these capacities than to 289 mAh/g.

The cathode material is tested in a two electrode setup where the positive electrode is prepared as described and the negative electrode is an $AB_5$ misch metal based metal hydride material dry compacted onto an expanded nickel substrate. A PP/PE separator saturated with 30 wt % KOH electrolyte is used in between these two electrodes. A Maccor automated electrochemical tester is used to cycle the cell. The cell is first charged 22 hours and 20 minutes at a charge rate of 25 mAh/g based on the active positive material and then discharged at the same rate to obtain the discharge capacity.

The invention claimed is:

1. A nickel hydroxide cathode active material for use in an alkaline rechargeable electrochemical cell, the cathode active material comprising an alpha-$Ni(OH)_2$ phase with an oxidation state on the Ni of +1 or lower, and where an electrochemical cell using the cathode active material in a positive electrode exhibits a discharge plateau near 0.8 V vs. a metal hydride anode during charge/discharge cycling.

2. A cathode active material according to claim 1, which is capable of transferring >1.67 electrons per Ni atom.

3. A cathode active material according to claim 1, where the specific capacity of the material is ≥330 mAh/g.

4. A cathode active material according to claim 1, where Ni reaches an oxidation state of less than $^+2$ during charge/discharge cycling of an alkaline rechargeable cell.

5. A cathode active material according to claim 1, which also exhibits a discharge plateau near 1.2 V and a discharge plateau at >1.2 V and <1.3 V.

6. A cathode active material according to claim 1 comprising one or more modifiers selected from the group consisting of Al, Ba, Bi, Ca, Co, Cr, Cu, F, Fe, In, La, Li, Mg, Mn, Na, Nd, Pb, Pr, Ru, Sb, Sc, Se, Sn, Sr, Te, Ti, Y and Zn.

7. A cathode active material according to claim 1 comprising one or more modifiers selected from the group consisting of Co, Zn and Al.

8. A cathode active material according to claim 1 selected from the group consisting of $(Ni,Co,Zn)(OH)_2$, $(Ni,Co)(OH)_2$, $(Ni Co,Al)(OH)_2$ and $(Ni,Co,Zn,Al)(OH)_2$.

9. A cathode active material according to claim 8 selected from the group consisting of $(Ni,Co)(OH)_2$ nickel hydroxides where Ni is present from about 89 atomic percent (at %) to about 99 at % and Co is present from about 1 at % to about 11 at %, based on 100at % total of Ni and Co combined.

10. A cathode active material according to claim 8 selected from the group consisting of $(Ni,Co,Al)(OH)_2$ nickel hydroxides where Ni is present from about 80 at % to about 90 at % and Co and Al together are from about 10 to about 20 at %, based on 100 at % total of Ni, Co and Al combined.

11. A cathode active material according to claim 10 where the atomic ratio of Co to Al is from about 1:1 to about 1:5.

12. A cathode active material according to claim 8 selected from the group consisting of $(Ni,Co,Zn,Al)(OH)_2$ nickel hydroxides where Ni is present from about 64 to about 74 at % and Co, Zn and Al together are present from about 26 to about 36 at %, based on 100 at % total of Ni, Co, Zn and Al combined.

13. A cathode active material according to claim 12 where the atomic ratio of Co to Al is from about 1:1 to about 1:5 or from about 1:2 to about 1:4.

14. A cathode active material according to claim 12 where the atomic ratio of Co to Zn is from about 1:2 to about 2:1.

15. A cathode active material according to claim 12 where the atomic ratio of Zn to Al is from about 1:1 to about 1:5.

16. A cathode active material according to claim 8 selected from the group consisting of $Ni_{0.94}Co_{0.06}(OH)_2$, $Ni_{0.85}Co_{0.05}Al_{0.10}(OH)_2$ and $Ni_{0.69}Co_{0.05}Zn_{0.06}Al_{0.2}(OH)_2$.

17. A positive electrode for use in an alkaline rechargeable electrochemical cell, the electrode comprising a cathode active material according to claim 1, a conductive substrate and optionally one or more components selected from binders and additives.

* * * * *